US009218646B1

(12) United States Patent
Boufounos et al.

(10) Patent No.: US 9,218,646 B1
(45) Date of Patent: Dec. 22, 2015

(54) DISTRIBUTED PATH PLANNING FOR MOBILE SENSORS

(71) Applicant: Mitsubishi Electric Research Laboratories, Inc., Cambridge, MA (US)

(72) Inventors: Petros T. Boufounos, Boston, MA (US); Richard Vaccaro, Kingston, RI (US); Mouhacine Benosman, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 11 days.

(21) Appl. No.: 14/294,417

(22) Filed: Jun. 3, 2014

(51) Int. Cl.
*G06K 9/00* (2006.01)
*G06T 3/40* (2006.01)
*G01S 7/40* (2006.01)
*G01J 3/28* (2006.01)
*G06T 7/00* (2006.01)

(52) U.S. Cl.
CPC .............. *G06T 3/4092* (2013.01); *G01J 3/2823* (2013.01); *G01S 7/4021* (2013.01); *G06T 7/0018* (2013.01); *G01J 2003/2879* (2013.01); *G06T 2207/10004* (2013.01); *G06T 2207/10036* (2013.01); *G06T 2207/10044* (2013.01); *G06T 2207/30244* (2013.01)

(58) Field of Classification Search
None
See application file for complete search history.

(56) References Cited

U.S. PATENT DOCUMENTS 8,184,157 B2 * 5/2012 Mittal ........................... 348/143
8,451,333 B2 * 5/2013 Sandler et al. ................ 348/169

OTHER PUBLICATIONS

Song et al., "Distributed camera networks", Signal Processing Magazine, IEEE , vol. 28, No. 3, pp. 20-31, May 2011.*
Nagatani et al., "Scan-point planning and 3-D map building for a 3-D laser range scanner in an outdoor environment", Field and Service Robotics, Springer Tracts in Advanced Robotics, vol. 62, 2010, pp. 207-217, 2010.*
Klein et al., "View planning for the 3D modelling of real world scenes", Applications of Computer Vision, 2000, Fifth IEEE Workshop on., pp. 186-191, 2000.*
Zhong et al., "Distributed coverage control and data collection with mobile sensor networks", Automatic Control, IEEE Transactions on , vol. 56, No. 10, pp. 2445-2455, Oct. 2011.*
C.G. Cassandras and W. Li, "Sensor Networks and Cooperative Control," Eur. J. Control, vol. 11, No. 4-5, pp. 436-463, 2005.
M. Zhong and C.G. Cassandras, "Distributed Coverage Control and Data Collection with Mobile Sensor Networks," IEEE Trans. Automat. Control, vol. 56, No. 10, pp. 2445-2455, 2011.
B. Hexsel, N. Chakraborty, and K. Sycara, "Distributed Coverage Control for Mobile Anisotropic Sensor Networks," Tech. Report CMU-RI-TR-13-01, Robotics Institute, Carnegie Mellon University, Jan. 2013.

* cited by examiner

*Primary Examiner* — Soo Park
(74) *Attorney, Agent, or Firm* — Dirk Brinkman; Gene Vinokur

(57) ABSTRACT

A method plans paths of a set of mobile sensors with changeable positions and orientations in an environment. Each sensor includes a processor, an imaging system and a communication system. A desired resolution of coverage of the environment is defined, and an achieved resolution of the coverage is initialized. For each time instant and each sensor, an image of the environment is acquired using the imaging system. The achieved resolution is updated according to the image. The sensor is moved to a next position and orientation based on the achieved resolution and the desired resolution. Then, local information of the sensor is distributed to other sensors using the communication system to optimize a coverage of the environment.

15 Claims, 7 Drawing Sheets

| Variable | Description | Value |
|---|---|---|
| H | Height of sensor | $30^1$ |
| $\gamma_h$ | Horizontal angular width | $20°$ |
| $\gamma_v$ | Vertical angular width | $2°$ |
| $(c_x, c_y)$ | $(x, y)$ position of sensor | arbitrary |
| $\phi$ | declination angle | arbitrary |
| $\psi$ | $90 - \phi$ | arbitrary |
| $\theta$ | Azimuth angle of sensor | arbitrary |

Fig. 3

DISTRIBUTED PATH PLANNING FOR MOBILE SENSORS

FIELD OF THE INVENTION

The invention relates generally to mobile sensors, and more particularly to distributed path planning for the sensors.

BACKGROUND OF THE INVENTION

Mobile sensor can be used to acquire images in a coordinated manner. The images can then be used in applications such as surveilance, cartography, and environmental monitoring. One problem in such systems is planning the paths the sensors should follow, a problem known as path planning.

In one such system with holonomic robots, where the controllable degrees of freedom are equal to the total degrees of freedom, anisotropic sensors with a bounded footprint are considered, see Hexsel et al., "Distributed Coverage Control for Mobile Anisotropic Sensor Networks," Tech. Report CMU-RI-TR-13-01, Robotics Institute, Carnegie Mellon University, January 2013. That system models a 2-dimensional (2D) environment as a polygon, possibly containing obstacles. A fixed objective function maximizes a joint probability to detect objects. The objective function uses an a priori fixed density function that represents an importance of each point in the environment.

SUMMARY OF THE INVENTION

The embodiments of the invention provide a method for planning paths of a set of mobile sensors, that can be, for example, airborne, ground-based, or underwater. Each sensor includes an imaging system for imaging an environment. The imaging system can use optical imaging, synthetic aperture radar (SAR), hyperspectral imaging, physical aperture radar imaging, for example. Images acquired by the sensors can be used in surveillance, cartography and monitoring applications, among others.

At any time instant, each sensor moves to a next position and orientation to optimize a resolution of the imaging system is used to select a resolution for optimal coverage of the environment, according to a pre-specified desired resolution at each point in the environment. As used herein, the resolution depends on the size and density of pixels in the images. It should be noted that the coverage can be complete, or partial and images can overlap or not.

In a distributed manner, the motion of each sensor and its orientation are optimized by minimizing a cost function that characterizes how well the environment has been imaged, compared to the pre-specified resolution. To perform this optimization, each sensor communicates with neighboring sensors, and exchanges local information. The images acquired by the sensors can be combined into an overall image of the environment to achieve the desired resolution.

BRIEF DESCRIPTION OF THE DRAWINGS

FIG. 3 is a table giving variables, description, and exemplar values used by a model according to embodiments of the invention;

DETAILED DESCRIPTION OF THE PREFERRED EMBODIMENTS

Figure 1:
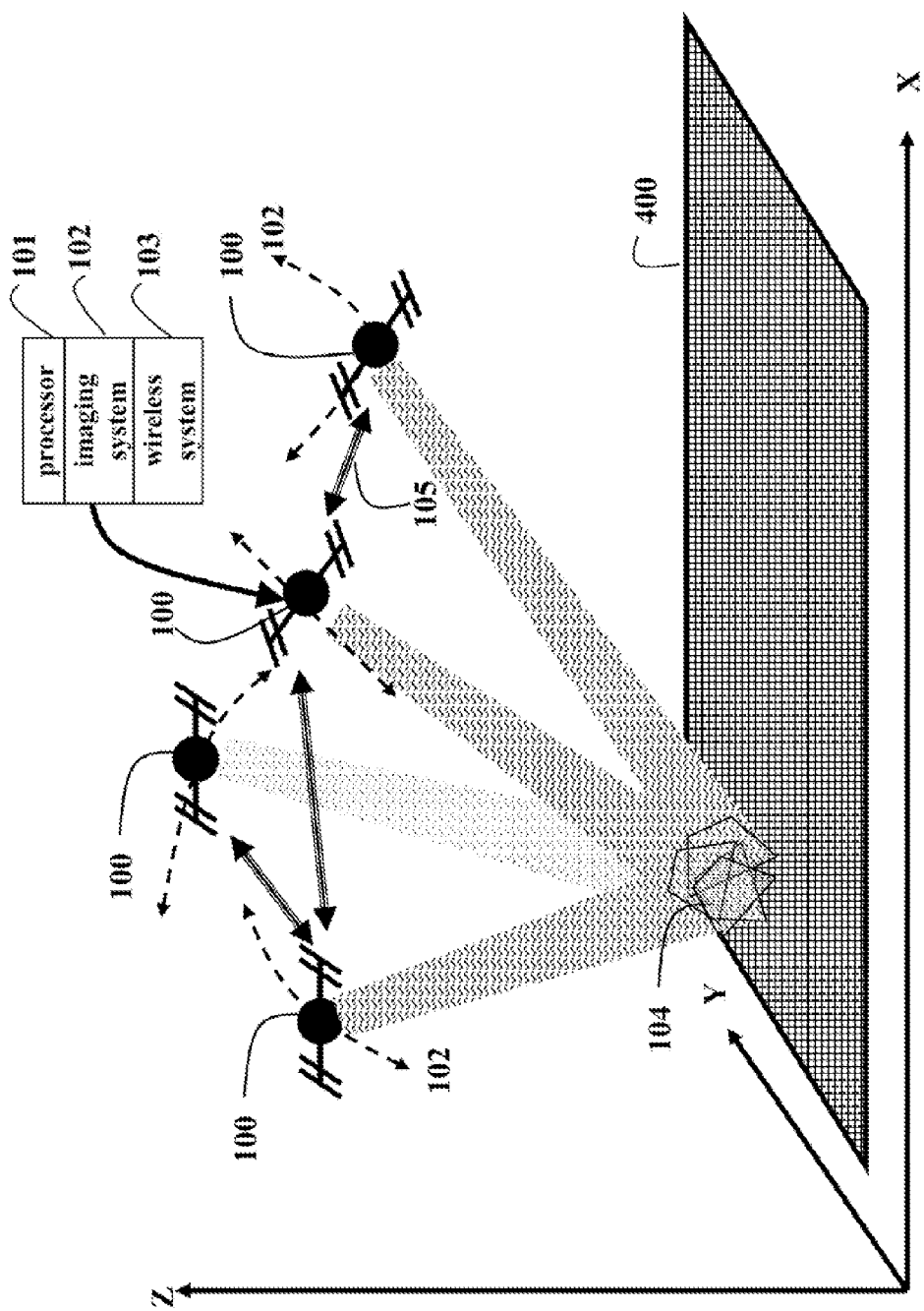
FIG. 1 is a schematic of an example airborne mobile sensor system according to embodiments of the invention.

FIG. 1 shows a set of mobile sensors 100 according to embodiments of our invention. The sensors can be airborne, ground-based or underwater, among others. The sensors can, for example, be arranged in indoor or outdoor drones, aircraft, or satellites. Each sensor includes a processor 101, an imaging system 102, and a communication system 103. The imaging system has a known footprint for imaging an environment 400, which may depend on the orientation of the sensor. The footprint is a projection of the imaging plane, such as a camera image plane or a radar beam pattern, onto the environment. The imaging system can use, among others, optical imaging, synthetic aperture radar (SAR), hyperspectral imaging, physical aperture radar imaging. For this reason, the term "image" is used broadly.

The sensors move along paths 102 to image the environment 400. The communication system includes a tranceiver so that the sensors can communicate with each other over channels 105. In the preferred embodiment the channels are wireless using, e.g., radio or optical signals. By exchanging information between neighboring sensors, i.e., sensors within communication range, the sensors can perform the path planning in a distrubted manner. However, it should be undertood that the other communication techniques can also be used, for example some or all of the sensors can use digital fine wire tethers.

It is an objective to provide an image resolution over the environment that achieves a specified value at each point in the environment. As used herein, the resolution depends on the size and density of pixels in the images. The model uses a subadditive function to model the resolution provided by overlapping footprints 104. The model also uses an objective function that is time varying. At each time j, the objective function provides a measure of a difference between a desired resolution and a resolution achieved up to a previous time j−1.

Sensor Model

Figure 2:
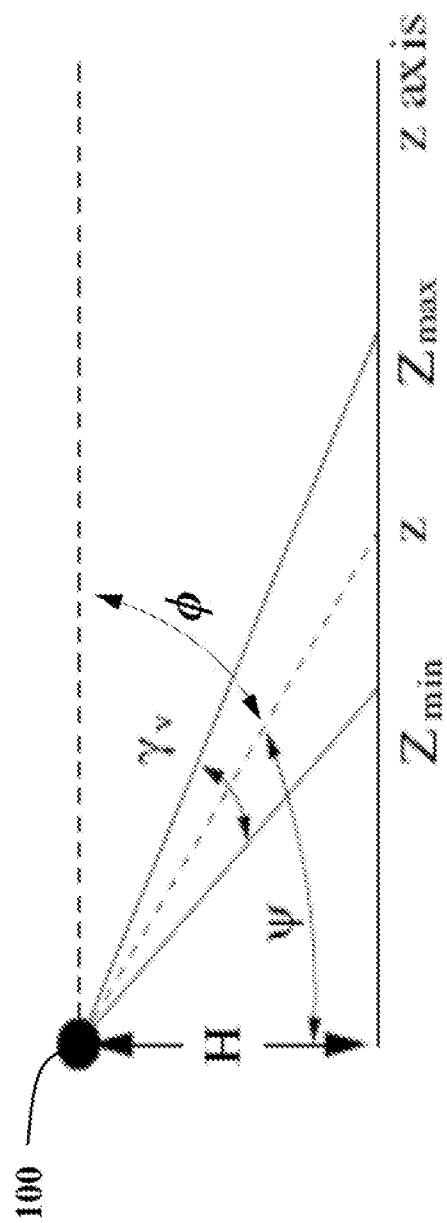
FIG. 2 is a side view of a sensor and environment in sensor coordinates according to embodiments of the invention.

FIG. 2 is a side view of a sensor and environment in sensor coordinates. A point z in the environment is located on a line bisecting an angle $\gamma_v$. The table in FIG. 3 gives the variables 301, description 302 and exemplar values 303 used by our model. The variables include a height 311 of the sensor, horizontal 312 and vertical 313 angular widths, position 314 of the sensor, and declination 315 and azimuth 317 angles. The angles specify the orientation of the sensors. In the described embodiment, there are two degrees of freedom, however three degrees are not precluded.

For conveninece, most of the subsequent computations use the angle $\psi$ 316 to measure the declination, which is related to the actual declination angle $\Phi$ using $\psi=90°-\Phi$. The labeled ranges in FIG. 2 are given by the following:

$$Z_{max} = H\tan(\psi+\gamma_v/2)$$

$$Z_{min} = H\tan(\psi-\gamma_v/2)$$

$$z = H\tan(\psi). \qquad (1)$$

Figure 4A:
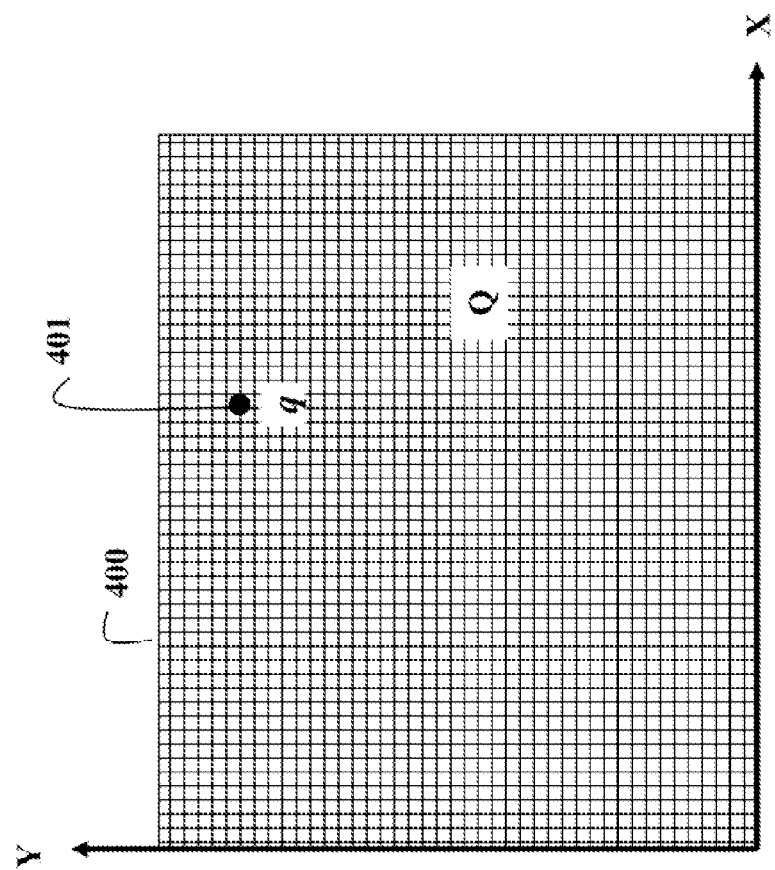
FIG. 4A is a schematic of an example environment according to embodiments of the invention.

As shown in FIG. 4A, an example regular environment is a 100×100 polygonal region Q in the xy plane. An arbitrary point 401 in the environment is labeled $q \in Q$. In sensor coordinates, the environment is the zy plane, which is a translated and rotated version of the xy plane. A given sensor is located at a height H above the origin of the zy plane and the angle $\psi$ is measured with respect to the z axis. The height H, and the x,y location specify the position of the sensors. The angles $\Phi$ and $\psi$ specify the orientation.

Figure 4B:
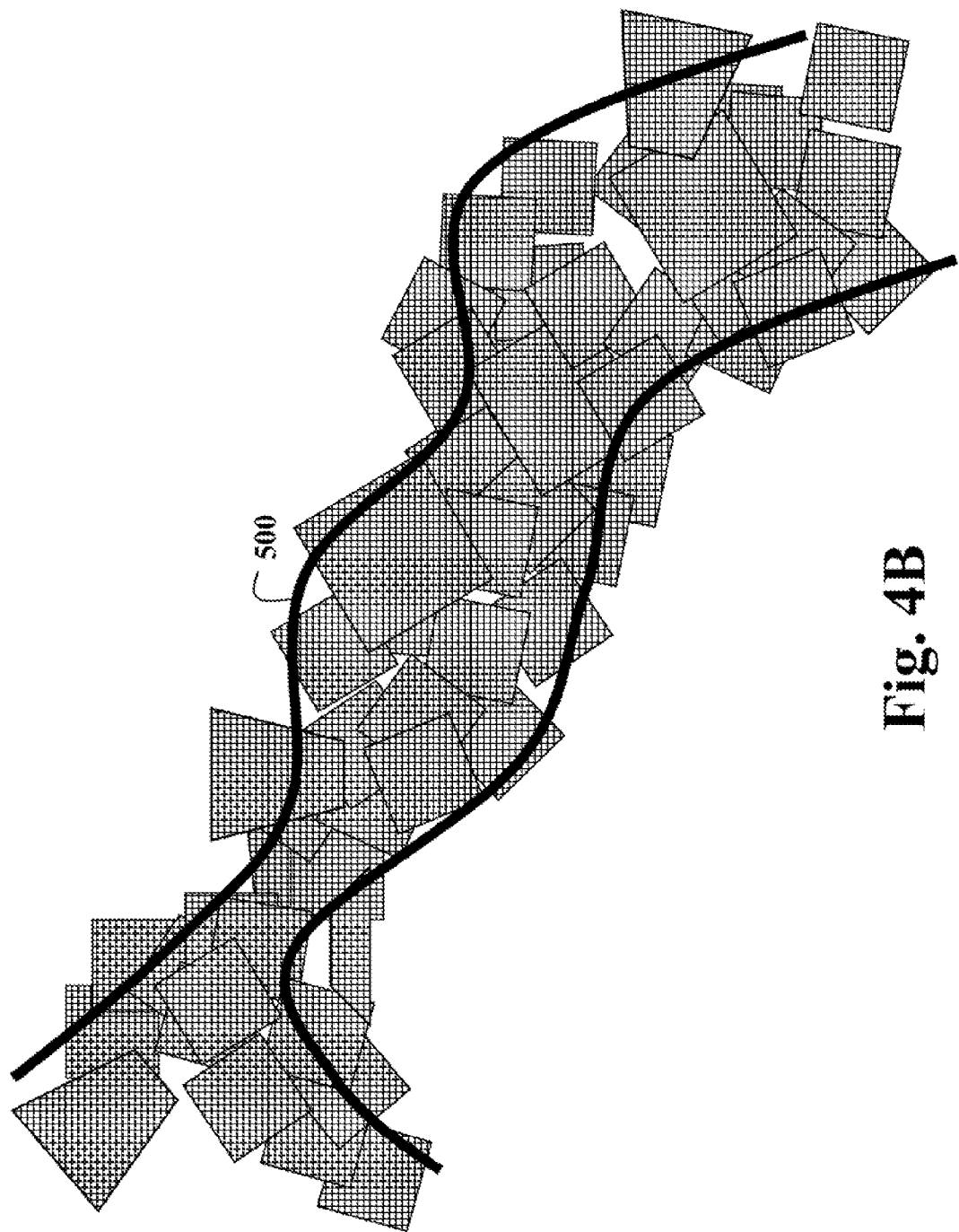
FIG. 4B is a schematic of an irregular example environment.

FIG. 4B shows an irregular example irregular environment 500.

Each sensor has the declination angle $\Phi$, with $\psi=90°-\Phi$. When the azimuth angle $\theta=0$, the z-axis of the sensor is aligned with the x-axis of a global coordinate system. All variables associated with the $i^{th}$ sensor have a superscript i for indexing the sensors.

Figure 5:
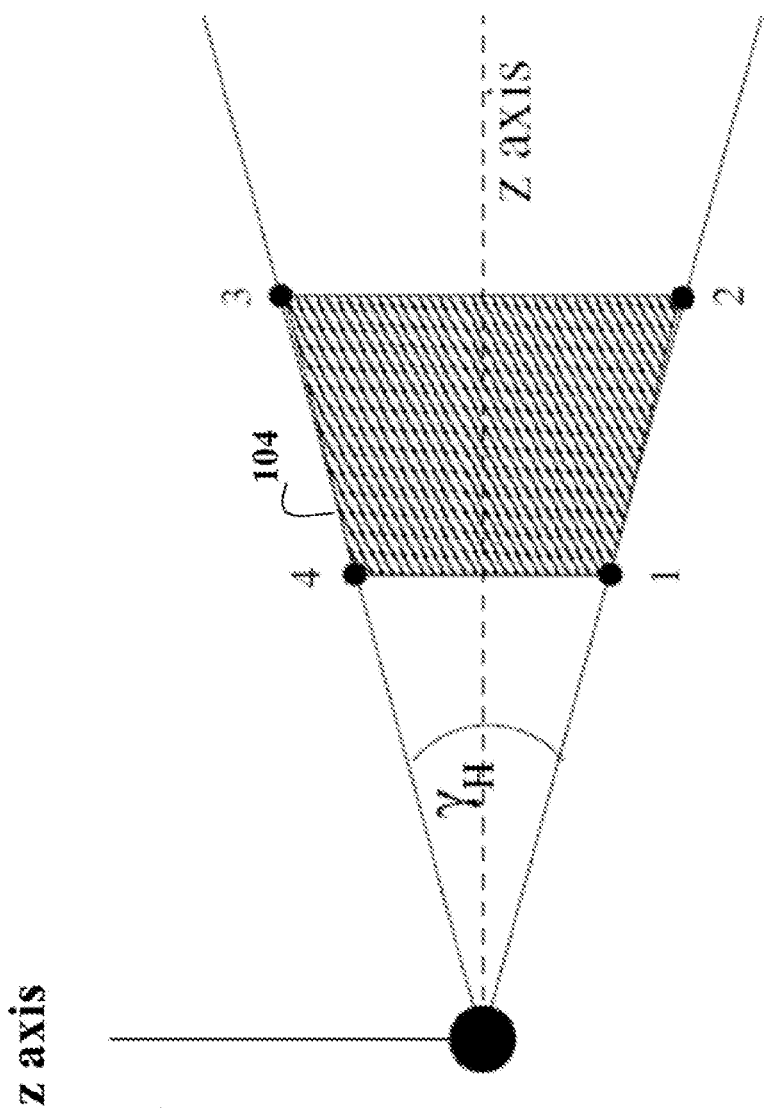
FIG. 5 is a top view of the sensor footprint in sensor coordinates according to embodiments of the invention.

FIG. 5 is an example of a top view of the sensor footprint 104 in sensor coordinates specific to an optical sensor. The footprint extends from $Z_{min}$ to $Z_{max}$ as shown in FIG. 2. The footprint is a polygon defined by the four labeled vertices (1, 2, 3, 4). In sensor coordinates, the footprint vertices $(z_k, y_k)$ corresponding to the $k^{th}$ vertex are $$\begin{bmatrix} z_1 & y_1 \\ z_2 & y_2 \\ z_3 & y_3 \\ z_4 & y_4 \end{bmatrix} = \begin{bmatrix} Z_{min} & -Z_{min}\sin(\gamma h/2) \\ Z_{max} & -Z_{max}\sin(\gamma h/2) \\ Z_{max} & Z_{max}\sin(\gamma h/2) \\ Z_{min} & Z_{min}\sin(\gamma h/2) \end{bmatrix}. \tag{2}$$

Let $S(\theta)$ be the rotation matrix defined below $$S(\theta) = \begin{bmatrix} \cos(\theta) & -\sin(\theta) \\ \sin(\theta) & \cos(\theta) \end{bmatrix}. \tag{3}$$

The global coordinates (x, y) of a point (z, y) in the sensor footprint are obtained by rotating the point by the azumith angle $\theta$, and translating the footprint by the camera location $(c_x, c_y)$:

$$\begin{bmatrix} x \\ y \end{bmatrix} = S(\theta) \begin{bmatrix} z \\ y \end{bmatrix} + \begin{bmatrix} c_x \\ c_y \end{bmatrix}. \tag{4}$$

The four vertices in equation (2) defining the sensor footprint 104 can be transformed into global coordinates using equation (4). The sensor footprint is defined by four variables $(c_x, c_y, \theta, \phi)$. The first two variables are the projection of the sensor position onto the environment plane, and the last two parameters are the horizontal and vertical angular variables. Other sensors may have different footprint shapes, with the footprint shape and size depending on the sensor orientation.

In most practical embodiments, the position parameters are updated on a relatively slow time scale because these parameters correspond to the physical position of the sensor, while the angular variables are updated on a relatively fast time scale because the angles can quickly change values. However, in some embodiments, position parameters and angle parameters might change values at the same time scale, or angle parameters might change values at a slower time scale.

Subadditive Combination of Overlapping Sensors

Assume that sensor i provides a resolution $r_i$ in the footprint $F_i$, i=1, ..., n. The problem is to model the resolution obtained in an intersection of complete or partial overlapping footprints. The best, and unrealistically optimistic, situation is for the overall resolution to be the sum of the individual resolutions. The worst, and unrealistically pessimistic, situation is for the overall resolution to equal the maximum of the individual sensor resolutions. The actual overall resolution is somewhere between these extremes.

That is, if $$r=[r_1 r_2 \ldots r_N] \tag{5}$$

is a vector of the resolutions achieved by N sensors, the overall resolution res(r) obtained at points in the intersection of the sensor footprints satisfies the following inequalities $$\max_i r_i \le res(r) \le r_1 + \ldots + r_N. \tag{6}$$

One example of a function that satisfies this property is the $l_p$ norm of the vector r, $1<p<\infty$, $$\|r\|_p \stackrel{def}{=} (r_1^p + \ldots + r_N^p)^{1/p}, \tag{7}$$

where $1<p<\infty$. When p=1, the $l_p$ norm equals the upper bound in equation (6). When $p=\infty$, the $l_p$ norm equals the lower bound in equation (6). Thus, a particular example of a subadditive model for the resolution obtained by overlapping sensors is the $l_p$ norm of a vector of individual resolutions, where $1<p<\infty$. Other embodiments can use different subadditive functions to model how images of different resolutions are combined.

Objective Function and Optimization

Let $\phi_d(q)$ be the desired resolution defined at every point q 401 in the environment 400. Let $x_j$ be a vector of the position variables of all of the sensors at time j. Let $\psi_j$ and $\theta_j$ be vectors corresponding to the vertical (declination) and horizontal (azimuth) angular variables at time j, respectively, of all of the sensors. Let $R^i$ be the resolution provided by the $i^{th}$ sensor at all points in its footprint $F_i$, which is defined by sensor variables $(cx^i, cy^i, \theta^i, \psi^i)$ as $$R^i(cx^i, cy^i, \theta^i, \psi^i, q) = \begin{cases} \dfrac{K}{H^2[1+\tan^2(\psi^i)]}, & q \in F_i(cx^i, cy^i, \theta^i, \psi^i) \\ 0, & \text{otherwise} \end{cases}, \tag{8}$$

where K is a sensor constant that depends on the number of pixels in an acquired image. If all of the sensors have the same value of K, then the value is unimportant for the optimization described below.

At any time j, the objective function we minimize is a difference between the desired resolution and an achieved resolution up to time j−1 according to the following function:

$$G_j(x, \theta, \psi) = \tag{9}$$
$$\int_Q f\left(\varphi_d(q) - \left[\varphi_{j-1}^p(q) + \sum_i (R^i(cx^i, cy^i, \theta^i, \psi^i, q))^p\right]^{1/p}\right) dq,$$

where $\phi_{j-1}(q)$ is the resolution achieved by the sensors up to time j−1, p defines the norm used to model a subadditive combination of overlapping footprints, and f(x) is a penalty function that penalizes deviation from the desired resolution.

For example, in one embodiment, $f(x)=x^2$. This penalty function penalizes the achieved resolution when the resolution is lower or greater than the desired resolution. This forces the sensors to move to a different area of the environment when some of the sensors have been mapped to a sufficient resolution.

In another embodiment, $$f(x) = \begin{cases} x^2, & x \geq 0 \\ 0, & x < 0 \end{cases}.$$

This penalty function penalizes the achieved resolution only when it has not attained the desired resolution, which enables the sensor to continue improving the resolution of the imaged area beyond the pre-specified desired resolution. Of course, other embodiments may use other penalty functions.

Path Planning

Figure 6:
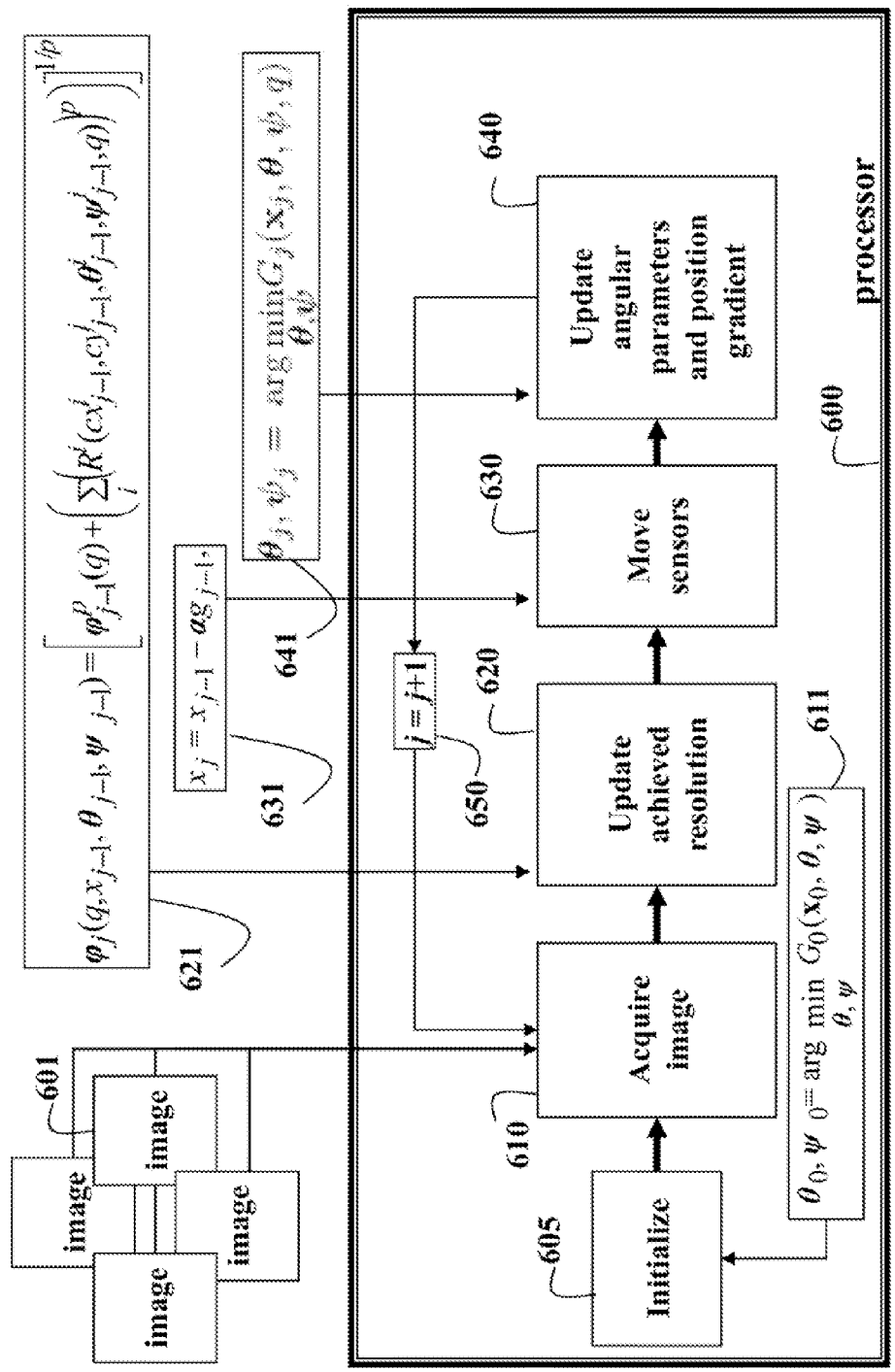
FIG. 6 is a flow diagram of a method for planning paths of the sensors shown in FIG. 1 according to embodiments of the invention.

FIG. 6 shows a method for path planning according to embodiments of the invention. By definition, the initial achieved resolution $\phi_0(q)$ is identically zero.

A gradient-based optimization is described by the following initialization and iterative steps. At each time j, a complete gradient-based minimization with respect to the angle parameters of the sensors is performed. However, sensor positions are updated using only a single gradient step. The reason is that after the sensors have moved and acquired new data, the objective function has changed.

Initialization

Given the desired resolution $\phi_d(q)$, and a vector $x_0$ of initial sensor positions, initial sensor angles are determined 605 by the following optimization 611

$$\theta_0, \psi_0 = \underset{\theta, \psi}{\mathrm{argmin}}\, G_0(x_0, \theta, \psi). \quad (11)$$

The initial position gradient $g_0$ is the gradient with respect to x of $G_0(x, \theta_0, \psi_0)$ evaluated at $x_0$.

Iteration 650 j=1, 2, . . . at each Sensor for each Time Step

Acquire 610 images 601 from all sensors 100, and update 620 an achieved resolution 621 according to $$\varphi_j(q, x_{j-1}, \theta_{j-1}, \psi_{j-1}) = \quad (12)$$
$$\left[\varphi_{j-1}^p(q) + \left(\sum_i (R^i(cx_{j-1}^i, cy_{j-1}^i, \theta_{j-1}^i, \psi_{j-1}^i, q))^p\right)\right]^{1/p}.$$

Moving 630 the set of sensors to a next position and orientation of the sensor based on the achieved resolution and the desired resolution. The moving is in a direction of the negative position gradient 631

$$x_j = x_{j-1} - \alpha g_{j-1} \quad (13)$$

where $\alpha$ is a step size, and $g_{j-1}$ is the position gradient at a previous time evaluated at position $x_{j-1}$. It should be understood that the moving to the next position and orientation can be a "null" move, i.e., the sensor remains in place.

Update 640 the sensor angular parameters and the position gradient 641 according to $$\theta_j, \psi_j = \underset{\theta, \psi}{\mathrm{argmin}}\, G_j(x_j, \theta, \psi) \quad (14)$$

$g_j$ = gradient with respect to x of $G_j(x, \theta_j, \psi_j)$ evaluated at $x_3$, and iterate for the next time instant j=j+1.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for planning paths of a set of sensors in an environment, wherein the sensors are mobile sensors with changeable positions and orientations, and each sensor includes a processor, an imaging system and a communication system, comprising the steps of:
defining a desired resolution of coverage of the environment;
initializing an achieved resolution of the coverage, and further comprising for each time instant in each processor of each sensor the steps of:
acquiring an image of the environment using the imaging system;
updating the achieved resolution according to the image; and
moving to a next position and orientation based on the achieved resolution and the desired resolution; and
distributing local information of the sensor to other sensors in the set of sensors using the communication system to optimize a coverage of the environment.

2. The method of claim 1, wherein the imaging system uses optical imaging.

3. The method of claim 1, wherein the imaging system uses synthetic aperture radar.

4. The method of claim 1, wherein the imaging system uses hyperspectral imaging.

5. The method of claim 1, wherein the imaging system uses physical aperture radar imaging.

6. The method of claim 1, wherein information comprises of the position, the orientation and the achieved resolution.

7. The method of claim 1, further comprising:
arranging the sensor in an indoor drone, an outdoor drone, an airplane, a statelitte, a ground vehicle, a robot, or an underwater vehicle.

8. The method of claim 1, wherein the communication system includes wireless channels.

9. The method of claim 1, wherein the positions are updated at a different rate than the orientations.

10. The method of claim 1, wherein a model of the resolution is subadditive.

11. The method of claim 1, further comprising:
minimizing a difference between the desired resolution and the achieved resolution using an objective function.

12. The method of claim 11, wherein the objective function uses a function that penalizes a deviation from the desired resolution.

13. The method of claim 12, wherein the function penalizes the achieved resolution when the resolution is lower or greater than the desired resolution.

14. The method of claim 12, wherein the function penalizes the achieved resolution only when the achieved resolution has not attained the desired resolution.

15. The method of claim 1, wherein the moving is in a direction of a negative position gradient.

* * * * *